United States Patent [19]
Limsico

[11] Patent Number: 5,793,952
[45] Date of Patent: Aug. 11, 1998

[54] METHOD AND APPARATUS FOR PROVIDING A SECURE REMOTE PASSWORD GRAPHIC INTERFACE

[75] Inventor: Carl Limsico, San Francisco, Calif.

[73] Assignee: Sun Microsystems, Inc., Palo Alto, Calif.

[21] Appl. No.: 649,214

[22] Filed: May 17, 1996

[51] Int. Cl.$^6$ .................................................. G06F 11/00
[52] U.S. Cl. ........................................................ 395/188.01
[58] Field of Search ................................. 395/186, 187.01, 395/188.01; 380/3, 4, 23, 25; 711/164

[56] References Cited

U.S. PATENT DOCUMENTS

| | | | |
|---|---|---|---|
| 5,267,149 | 11/1993 | Anada et al. | 364/408 |
| 5,606,663 | 2/1997 | Kadooka | 395/188.01 |
| 5,611,048 | 3/1997 | Jacobs et al. | 395/200.09 |

FOREIGN PATENT DOCUMENTS

| | | | |
|---|---|---|---|
| 36/622621 | 5/1986 | Japan | G06F 15/21 |
| 40/209212 | 9/1988 | Japan | H04L 9/06 |
| 199157 | 1/1989 | Japan | G06F 15/00 |
| 4-84254 | 4/1992 | Japan | G06F 11/30 |
| 430241 | 4/1992 | Japan | G06F 15/00 |

OTHER PUBLICATIONS

LIBES, Don, "Using expect to Automate System Administration Tasks," *Proceedings of the Fourth USENIX LISA Large Installation Systems Administration (LISA) Conference*, Colorado Springs, Colorado, Oct. 17–19, 1990.

LIBES, Don, "expect: Curing Those Uncontrollable Fits of Interaction," *Proceedings of the Summer 1990 USENIX Conference* Anaheim, California, Jun., 1990.

LIBES, Don, "Regression Testing and Conformance Testing Interactive Programs," Summer '92 USENIX, San Antonio, Texas, Jun. 8–12, 1992.

LIBES, Don, "expect: Scripts for Controlling Interactive Processes," *Computing Systems*, vol. 4, No. 2, University of California Press, Berkeley, California, Nov. 1991.

*Primary Examiner*—Albert Decady
*Attorney, Agent, or Firm*—Hecker & Harriman

[57] ABSTRACT

A method and apparatus for providing a secure remote password graphic interface. In an embodiment of the invention, an improved password changer provides the capability to securely change a user's password at a remote location without the necessity of the user executing commands to the remote machine. A local graphic interface is provided for entry and initial validation of the user's proposed new password. Once validated, the user's login and password data is securely stored in temporary memory allocated during operation of the invention, and communication is initiated with the remote machine. All commands necessary to change the user's password at the remote machine are handled by an embodiment of the invention without the requirement of user intervention. The present invention improves remote password updating by eliminating the user's need to understand the command structure of the operating system running at the remote machine.

32 Claims, 11 Drawing Sheets

METHOD AND APPARATUS FOR PROVIDING A SECURE REMOTE PASSWORD GRAPHIC INTERFACE

BACKGROUND OF THE INVENTION

1. Field of the Invention

The invention relates to the field of computer science, and, in particular, to a method and apparatus for providing a secure remote password graphic interface.

2. Background

Users of computer systems of all sizes are typically assigned individual user accounts consisting of a user login name and a password. These accounts are not generally public accounts. Instead, these accounts are intended for a particular user's sole use. Within such an account, a user can keep data that is not generally made known to the rest of the computer system's users. For example, a user's account may contain sensitive or private data that the user wishes to remain confidential. Alternatively, a user may selectively grant access to the confidential data to a limited number of other users on the system.

Each user account typically has associated with it a login and a password. When a user wishes to access his or her account, the user provides the login to the computer system, typically by entering the login through a terminal. If the login is recognized by the computer system, the user is then prompted to provide the appropriate password associated with that particular login. The computer system again determines whether the password provided by the user matches the password of record for the login account. If the password matches, access is given. If the password does not match, access to the specified account is denied. By requiring users to provide a password to gain access to an account, unauthorized access to data (at least through generally available means) is eliminated.

In certain distributed computer systems, a user working at one computer may need to access data that is resident on a remote computer. For example, if a user's computer contains data that is to be updated based on changes to a master database located at the remote computer, the user may access the remote computer. In a large client-server distributed database system, the master data may not be available to all users. Instead, authorization to access the data may be selectively managed so that some users can only access a portion of the data.

To efficiently manage each user's authorization level, a remote database computer may require each user to maintain a separate login account. For example, each user would be provided with an individual login account and password that must be provided to the remote computer before access to all or a portion of the remote computer's data is granted to the user.

To increase the level of security of each user's account, it is generally suggested that users change their passwords on a regular basis, and especially when they believe that the confidentiality of their password may have been compromised. To encourage users to change their passwords when needed, it is desired that the process for changing one's password not be burdensome for the user. Where users have difficulty changing their password, or where the process for changing the password requires special skill or training, users may choose to forgo changing their password. When this happens, the security of all of the data associated with a user's account may be compromised.

Although today a large number of people use computer software for business and personal applications, generally only a portion of these users have specialized knowledge of computer operating systems such as, for example, the UNIX™, NextStep™ or DOS™ operating systems. Computer applications are often written today with the unskilled user in mind. These applications present "user-friendly" interfaces to assist users in their computing tasks. For example, word processing and financial software packages often provide "graphic user interfaces" (GUI's) to the user to facilitate the input and output of data, and provide users with a means to invoke commands. These GUI's enable users to operate the software without the need for specialized computer training or a thorough knowledge of operating system syntax and commands.

In the distributed data processing example discussed above, it is possible that, although the user may be trained to understand and operate the operating system of the local computer and the computer software running at the local computer, the user may not understand the operating system of the remote computer. When the user wishes to change his or her password on the remote computer account, the user may be stymied by a lack of experience or knowledge concerning the operating system of the remote computer. Unable to figure out how to interact with the remote computer, the user may choose to not update or change his or her password. Alternatively, the user may ask a co-worker in the computer services or information systems department to change the password. Asking another to update or change a user's password may very well further compromise the security of the database system, since that person will know the user's password and could gain otherwise unauthorized access the user's account.

For example, suppose that a user's remote account is located on a computer running under the UNIX operating system. As a command line driven operating system, some users who are familiar or comfortable only with GUI computer applications may have difficulty learning how to change their password on the remote UNIX system. Other users, although capable of learning how to invoke commands on a computer running the UNIX operating system, may decide that it is not worth the time and effort to learn the UNIX system just to change one's password since changing passwords is not a action that a user performs every day.

It is therefore desirable to provide a mechanism through which users can easily update their passwords without having to learn the intricacies of computer operating systems.

SUMMARY OF THE PRESENT INVENTION

An embodiment of the invention provides a method and apparatus for providing a secure remote password graphic interface for use on a computer system. Using an embodiment of the invention, a user's password may be easily and securely changed at a remote machine from the user's local machine.

In an embodiment of the invention, when a user wishes to change or update the password associated with the user's account, the user invokes a password changer program which displays a graphic user interface on the user's display. The user enters the user's login, current password, and proposed new password into fields displayed in the graphic user interface window. These values are not permanently stored in memory, but are stored in temporary memory allocated while the password changer program is running, and de-allocated after the password changer program is terminated.

Once the user's login and password information is entered, the proposed new password may be validated to ensure that it meets the password requirements of the remote computing system. Once the proposed password is locally validated, the password changer program initiates a connection with the remote machine, and initiates and completes the login and password changing procedures at the remote machine without further input or assistance from the user. In this way, the user's password is easily and securely updated at the remote machine without requiring the user to understand the operation of the operating system running at the remote machine.

DETAILED DESCRIPTION OF THE PRESENT INVENTION

A method and apparatus for providing a secure remote password graphic interface is described. In the following description, numerous specific details, such as UNIX commands and the physical specifics of the graphic interface, are described in order to provide a more thorough description of the invention. It will be apparent, however, to one skilled in the art, that the invention may be practiced without these specific details. In other instances, well-known features have not been described in detail in order not to unnecessarily obscure the invention.

An embodiment of the invention provides a mechanism for changing a user's password on a remote computer system without requiring a user to know how to use operating system-specific commands for the remote system. Using an embodiment of the invention, a user can invoke a password changing routine at the local station that provides a graphic user interface (GUI). The user enters the appropriate login, current password and new password for the remote computer system into fields in the password changer GUI. An embodiment of the invention determines if the new password meets all or some of the requirements of the remote system and, if so, communicates with the remote system to change the user's password.

An embodiment of the invention provides a secure means for remotely changing a user's password. None of the user's information is stored in a file or address at the local computer where it can be subsequently retrieved by unauthorized users. Instead, the user's login and password information is temporarily stored in a memory location specifically allocated at the time an embodiment of the invention is invoked. This memory is de-allocated at program termination, and the user's information is removed rom temporary memory storage. Thus, once the user enters login and password information using an embodiment of the invention, increased security is provided against unauthorized access.

Computer System

Figure 4:
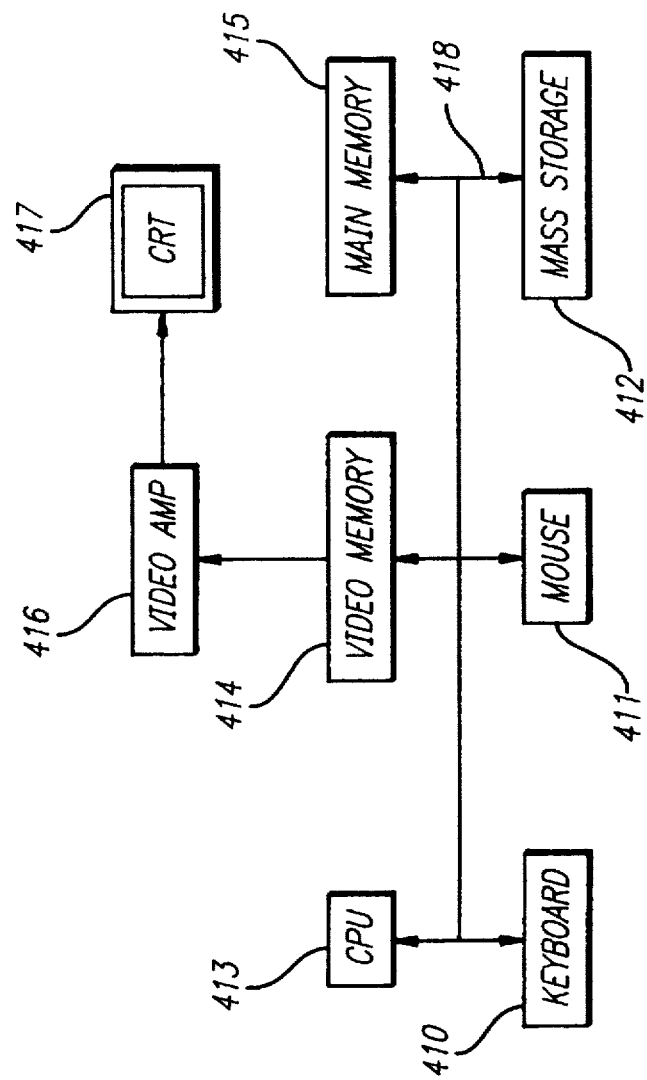
FIG. 4 is a block diagram showing one computer system for use with an embodiment of the invention.

An embodiment of the invention may be implemented on any conventional or general purpose computer system or computer based database system. An example of one embodiment of a computer system for implementing this invention is illustrated in FIG. 4. A keyboard 410 and mouse 411 are coupled to a bi-directional system bus 418. The keyboard and mouse are for introducing user input to the computer system and communicating that user input to central processing unit (CPU) 413. The computer system of FIG. 4 may also include a video memory 414, main memory 415 and mass storage 412, all coupled to bi-directional system bus 418 along with keyboard 410, mouse 411 and CPU 413. The mass storage 412 may include both fixed and removable media, such as magnetic, optical or magnetic optical storage systems or any other available mass storage technology. Bus 418 may contain, for example, thirty-two address lines for addressing video memory 414 or main memory 415. The system bus 418 also includes, for example, a 32-bit data bus for transferring data between and among the components, such as CPU 413, main memory 415, video memory 414 and mass storage 412. Alternatively, multiplex data/address lines may be used instead of separate data and address lines.

In one embodiment of this invention, the CPU 413 is a 32-bit or 64-bit microprocessor. However, any other suitable microprocessor or microcomputer may be utilized. Main memory 415 is comprised of dynamic random access memory (DRAM). Video memory 414 is a dual-ported video random access memory. One port of the video memory 414 is coupled to video amplifier 416. At least 32 Mbytes of memory are used in the preferred embodiment. More or less memory may be used without departing from the scope of this invention. The video amplifier 416 is used to drive the cathode ray tube (CRT) raster monitor 417. Video amplifier 416 is well known in the art and may be implemented by any suitable means. This circuitry converts pixel data stored in video memory 414 to a raster signal suitable for use by monitor 417. Monitor 417 may be a type of monitor suitable for displaying textual and/or graphic images.

The computer system described above is for purposes of example only. An embodiment of the invention may be implemented in any type of computer system processing environment or on any hardware or combination of hardware, software and computer system.

Preferred Embodiment

The operation of one embodiment of the invention is shown in the series of flowcharts illustrated in FIGS. 5A through 5G. In the embodiment described below, the invention is used to change a user's password at a remote machine location. It will be readily apparent to those skilled in the art that embodiments of the invention are equally applicable to local applications as well. Also, although one embodiment of the invention is described in connection with the UNIX operating system, the invention will work equally well with other operating systems.

Figure 5A:
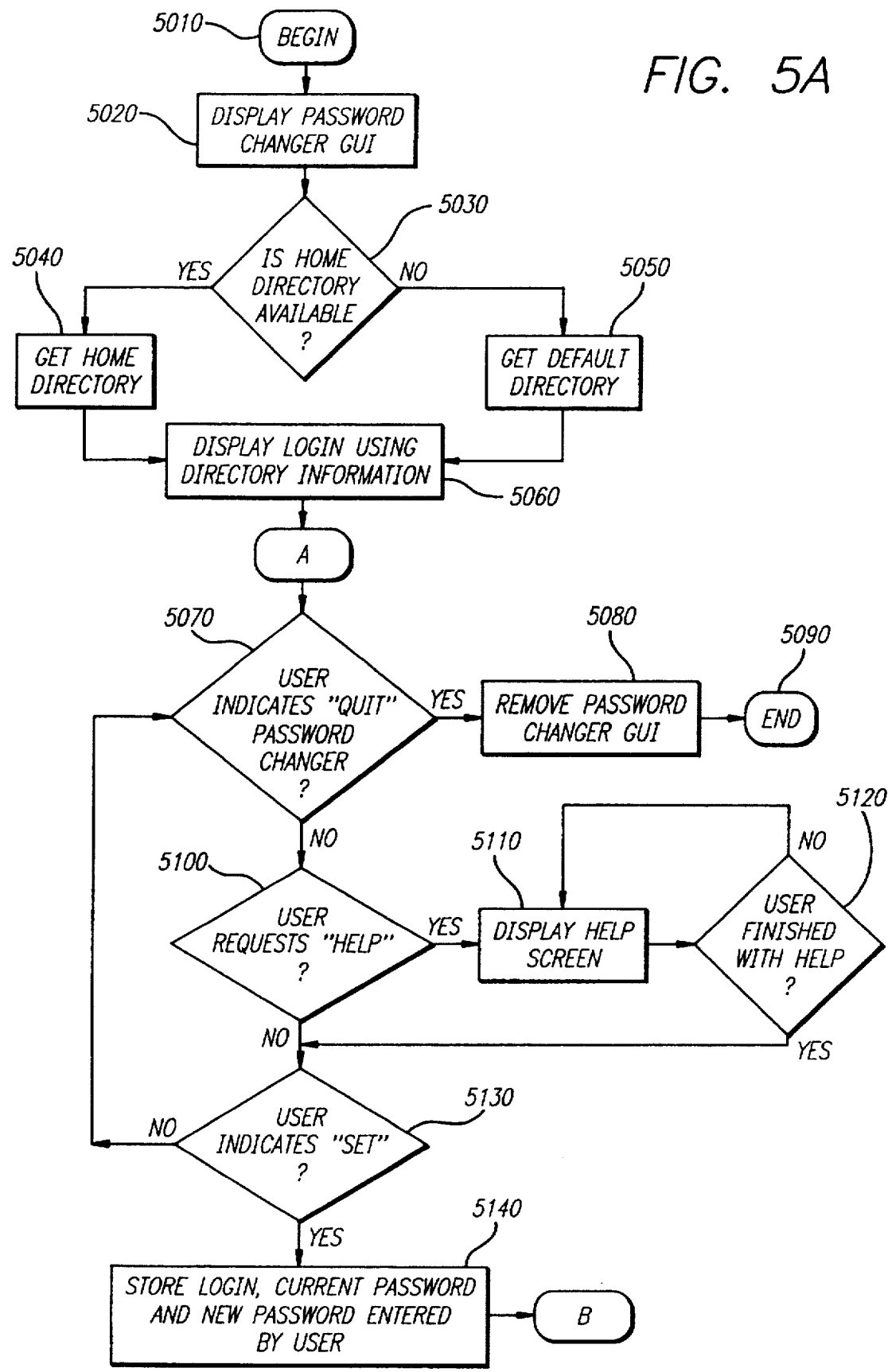
FIGS. 5A through 5G are flowcharts illustrating the process flow of an embodiment of the invention.
Figure 5B:
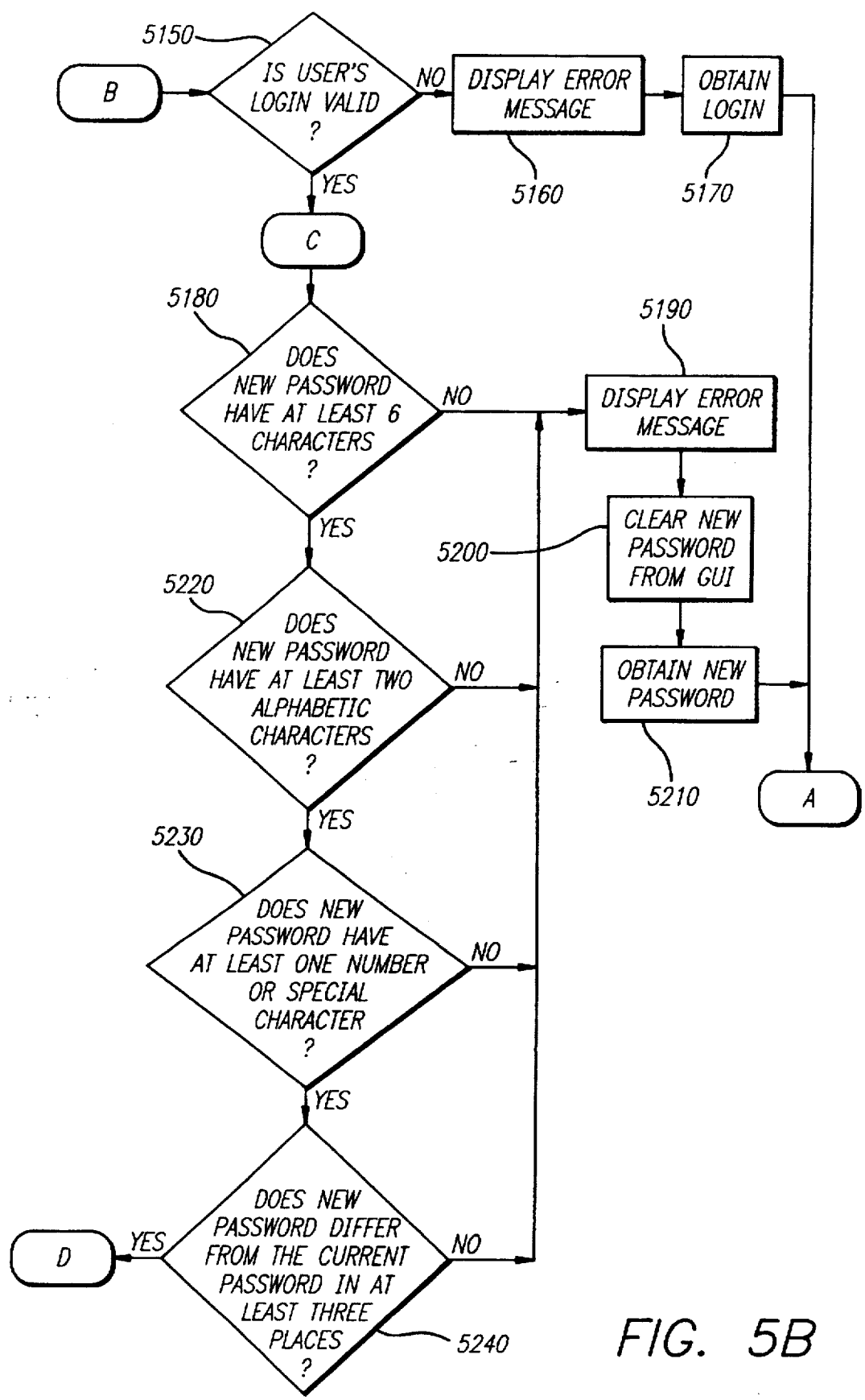
Figure 5C:
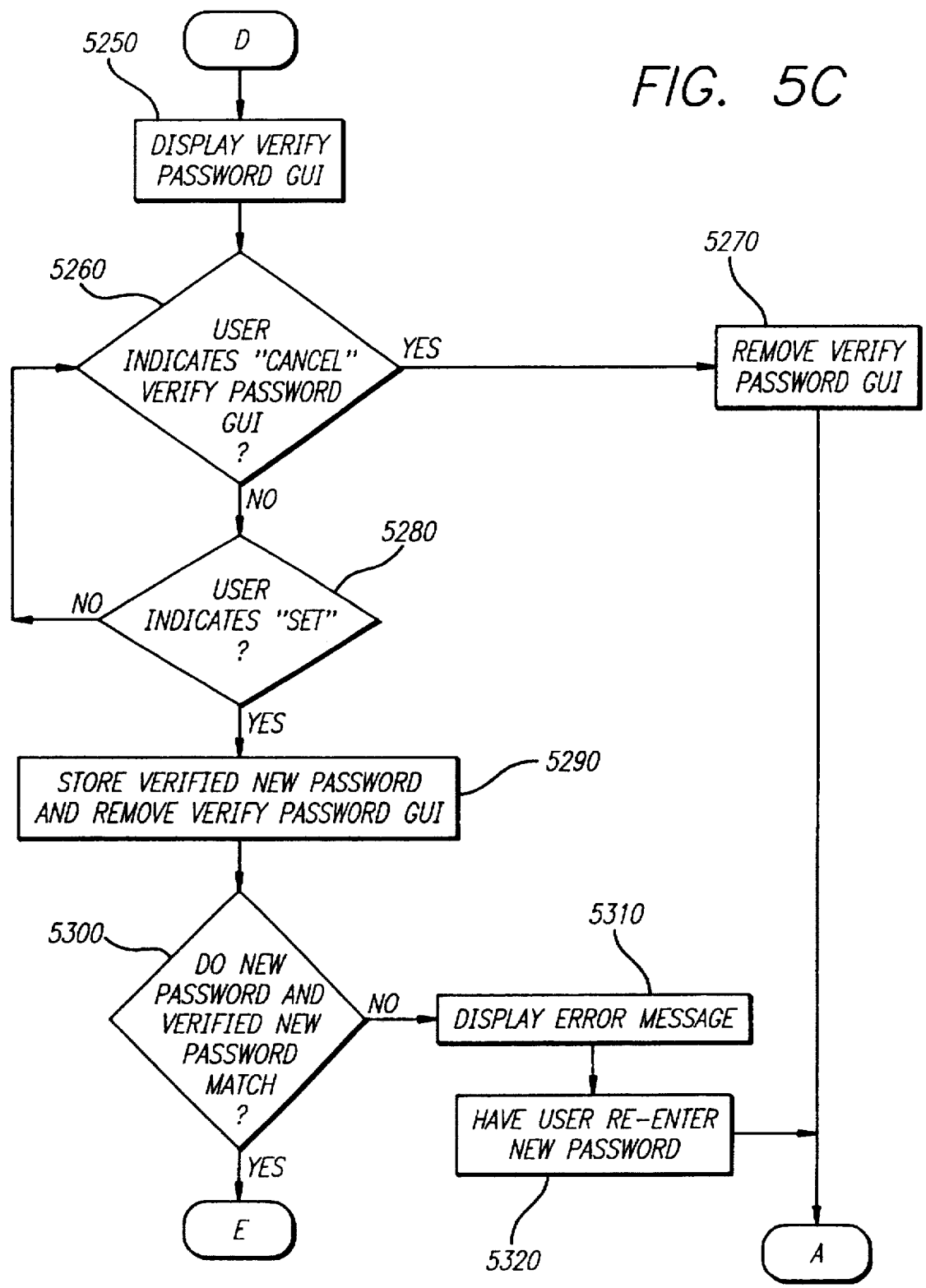
Figure 5D:
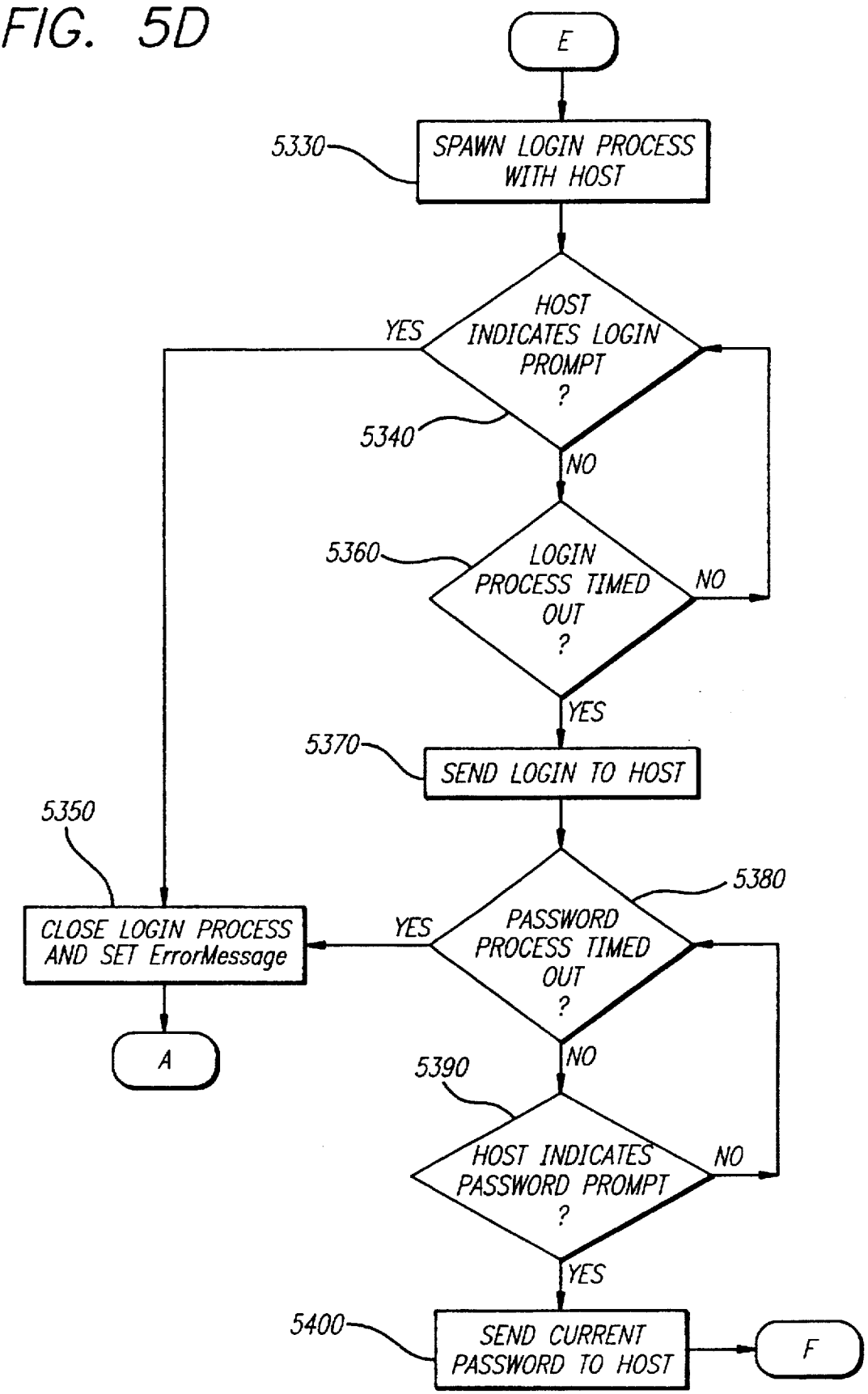
Figures 1, 5E:
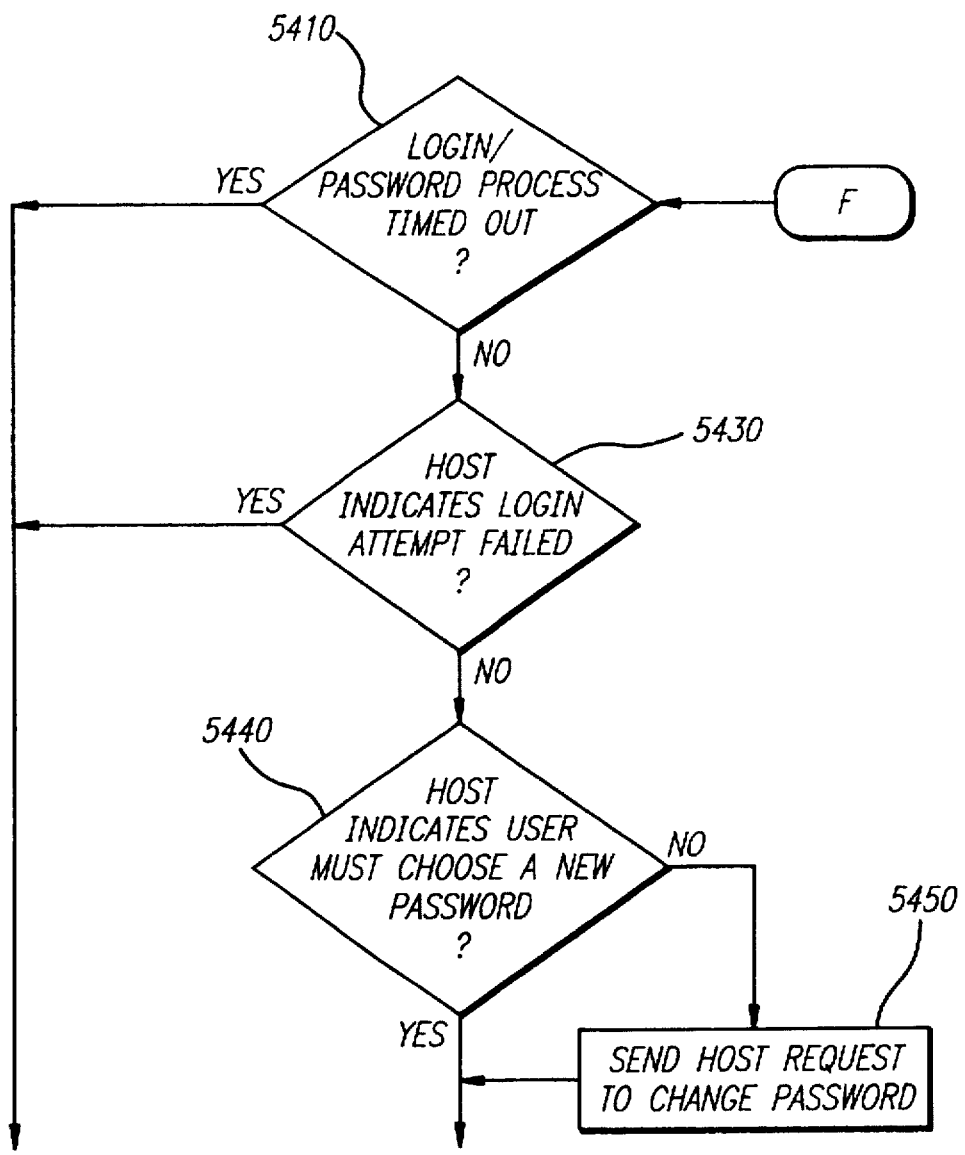
Figures 2, 5E:
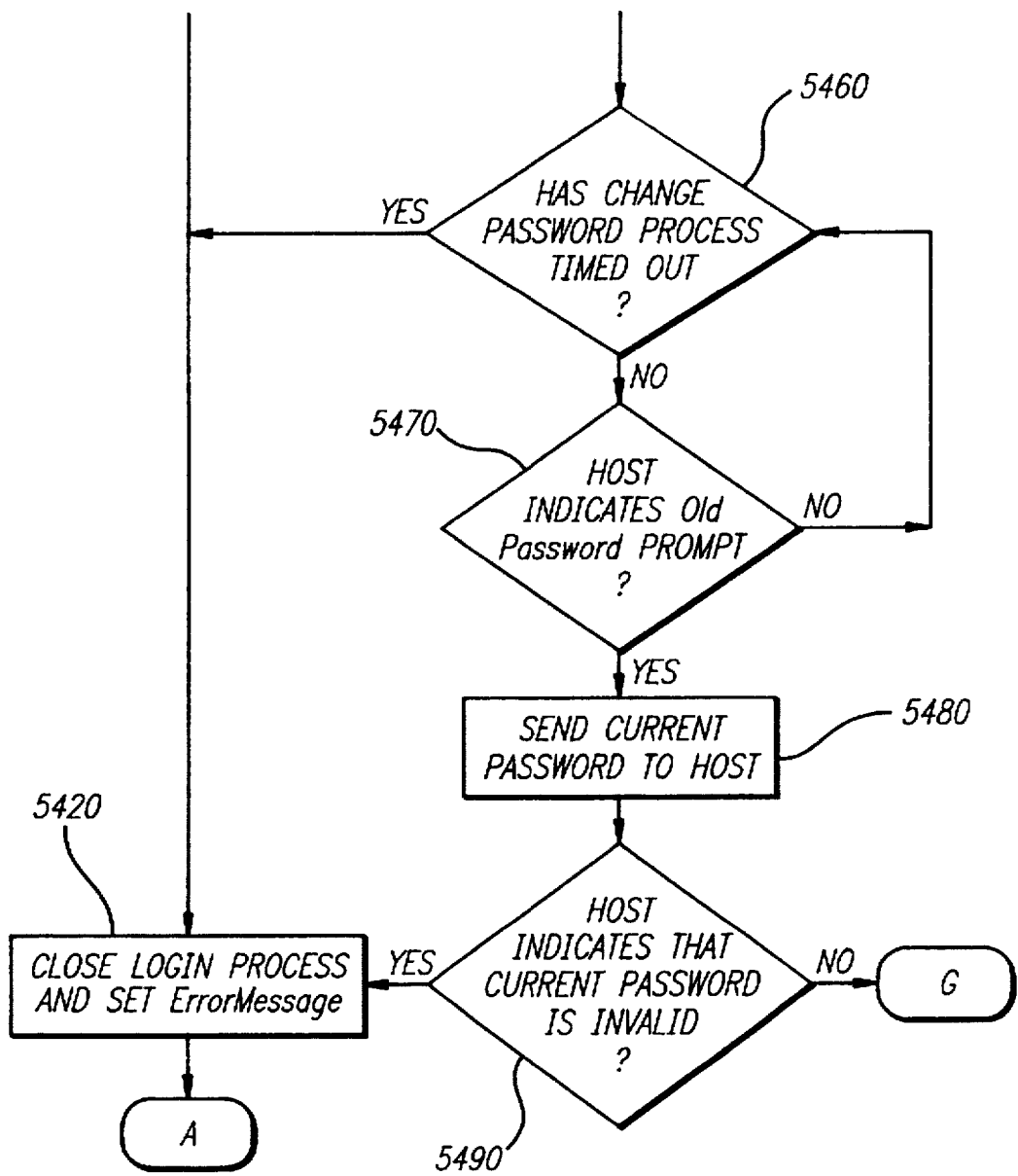
Figure 5F:
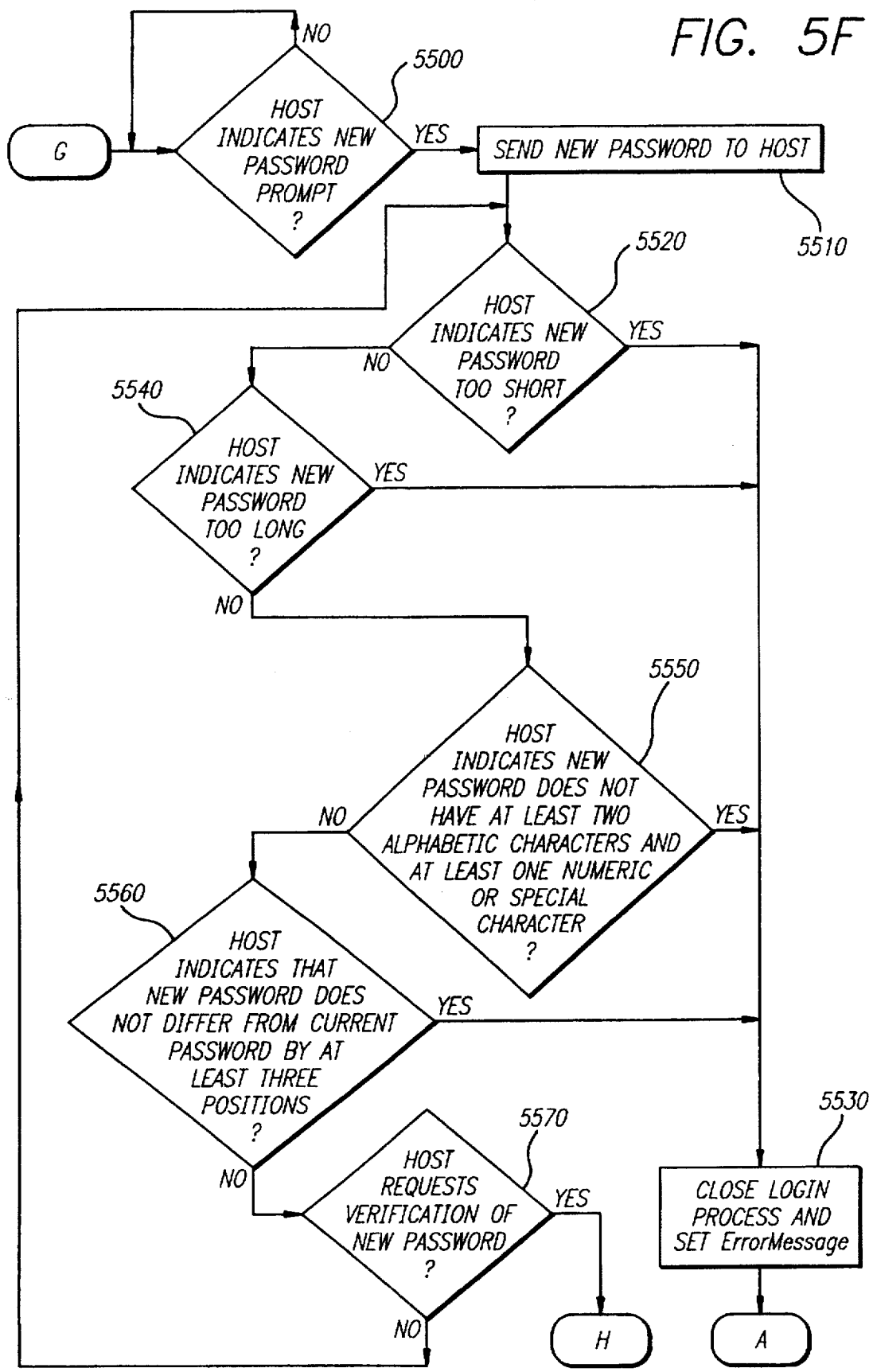
Figure 5G:
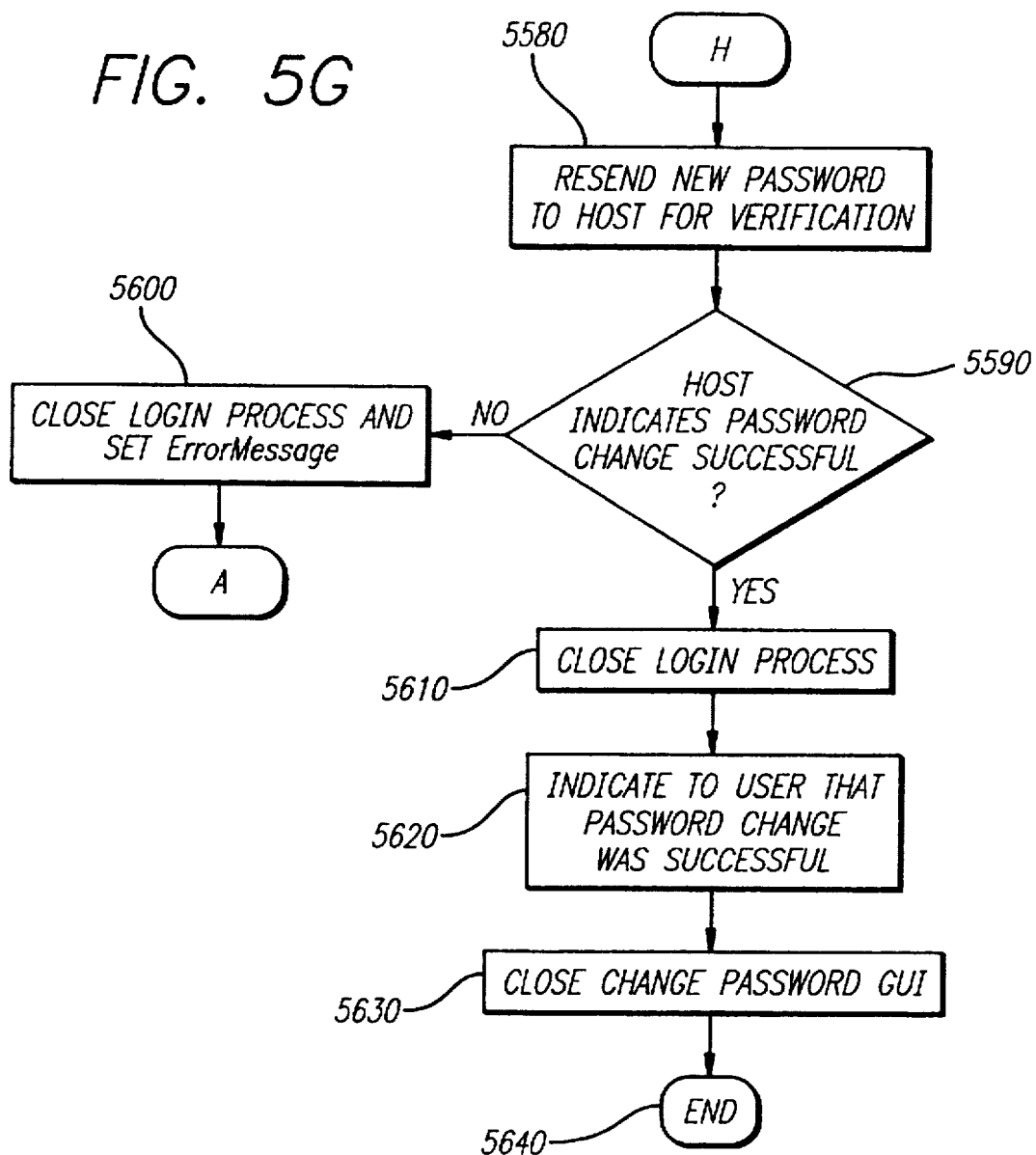

Starting in FIG. 5A, the operation of one embodiment of the invention is described. At step 5010, the user invokes the password changer program of the invention. This program may be written in software, or it may be hardwired into the local computer. Invocation of the password changer program by the user may be accomplished by a number of different methods depending upon the operating system running at the local computer. For example, the user could invoke the program by double clicking the cursor over the display icon of the password changer program, or by choosing the appropriate menu selection from a pull-down menu, or by selecting the name of the program from a list of applications provided by a dialog box displayed on the screen.

Figure 1:
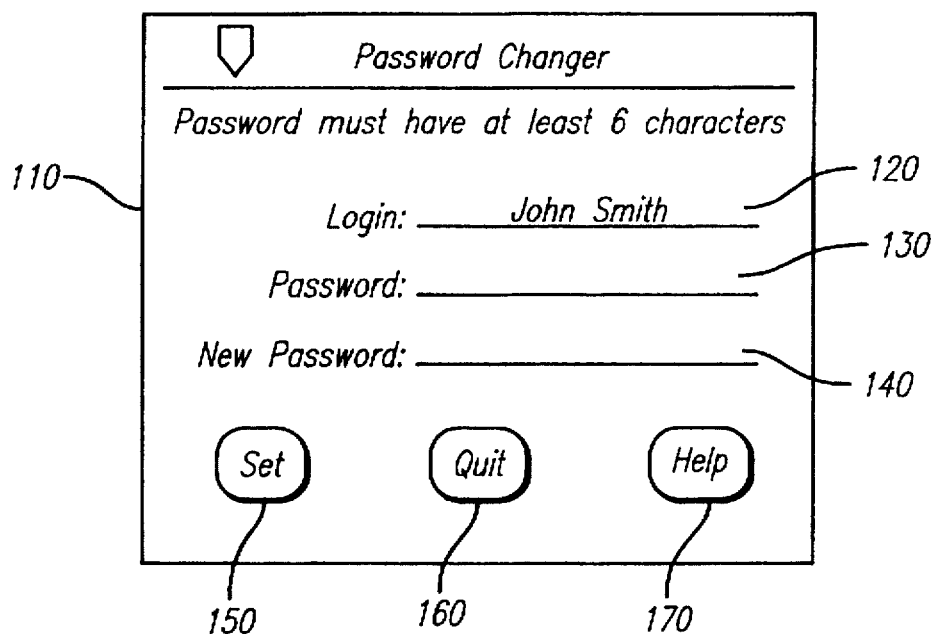
FIG. 1 is a block diagram illustrating a password changer graphic user interface for use with one embodiment of an embodiment of the invention.

Once invoked, at step 5020 the password changer program displays a GUI dialog on the screen to facilitate entry of the user's login and password information. An example of a password changer GUI that may be used with the embodiment of the invention shown in FIG. 1. The password changer window 110 may include an entry field 120 for a user's login, an entry field 130 for the user's current password, and an entry field 140 for the user's proposed new password. Each of these fields are configured to accept numeric, alphabetic or alphanumeric information.

Password changer window 110 may also contain other elements. For example, in FIG. 1, window 110 includes three graphic buttons: a set button 150, a quit button 160, and a help button 170. When a user wishes to activate any of these buttons, the user may position the screen cursor over the button of choice and indicate entry of that selection. For example, if the user wishes to view help information about the password changing process and procedure, the user may use the mouse to position the screen cursor over help button 170 and depress the mouse button to indicate that selection.

Returning to FIG. 5A, after the password changer GUI window 110 is displayed at step 5020, the process determines whether the user's home directory is available at step 5030. If it is available, then the home directory at the remote location is obtained at step 5040. If it is not available, then the default directory is obtained at step 5050. Either way, at step 5060 the directory information is displayed in field 120 of password changer window 110. For example, in FIG. 1, the login "John Smith" is displayed in field 120. Alternatively, field 120 may be left blank and the user may be required to enter this information.

If the user selects the quit button at step 5070, control of the process proceeds to step 5080 where the password changer window 110 is removed from the display. The password changer program is then terminated at step 5090 and the user's password is not changed.

If the user selects the help button at step 5100, the system displays help information at step 5110. At decision block 5120, the system waits until the user is finished with the help information before proceeding to decision block 5130.

At decision block 5130, the system determines if the user has indicated "set." This may be signified by the user depressing set button 150 in window 110, or by pressing the return key on the keyboard. If the user has not indicated set, then control returns to decision block 5070. If the user has indicated set, then the data entered in the login field 120, password field 130 and new password field 140 are stored in temporary memory at step 5140, and control proceeds to step 5150. This temporary memory is allocated at the time the password changer program is commenced, and in the preferred embodiment is de-allocated once the password changer program is terminated.

At step 5150, the system determines whether the login data entered by the user in field 120 is a valid user's login. If it is not a valid login, control proceeds to step 5160 where the appropriate error message is displayed. At step 5170, the user is directed to re-enter the login information in field 120, and control proceeds to step 5070.

If the user has entered a valid login, the user's new password is then validated through decision blocks 5180, 5220, 5230 and 5240. At decision block 5180, the new password is examined to see if contains at least 6 characters. If it has 5 or fewer characters, control proceeds to step 5190, where the appropriate error message is displayed. At step 5200, the information previously entered in new password field 140 is deleted. Alternatively, the data in field 140 could be highlighted. At step 5210, the user is directed to re-enter the proposed new password, and control proceeds to step 5070.

If it is determined that the new password has at least 6 characters, control proceeds to decision block 5220, where it is determined whether the new password has at least two alphabetic characters. If the password does not meet this criteria, control proceeds to step 5190 and the user is directed to select an alternate new password. If the criteria at step 5220 is met, control proceeds to decision block 5230.

At decision block 5230, the new password is examined to determine if it contains at least one numeric or "special" character (for example, a "@," "%," "#," or "$" character). If the password does not meet this criteria, control proceeds to step 5190 and the user is directed to select an alternate new password. If the criteria at step 5230 is met, control proceeds to decision block 5240.

At decision block 5240, the new password is examined to ensure that the new password and the old password differ in at least three places. If the new password does not meet this criteria, control proceeds to step 5190 and the user is directed to select an alternate new password. If the criteria at step 5240 is met, control proceeds to step 5250.

It will be obvious to one skilled in the art that the invention may be practiced without one or more of the password validation criteria described above. Also, these validation criteria may be amended without departing from the spirit and scope of the invention.

Figure 2:
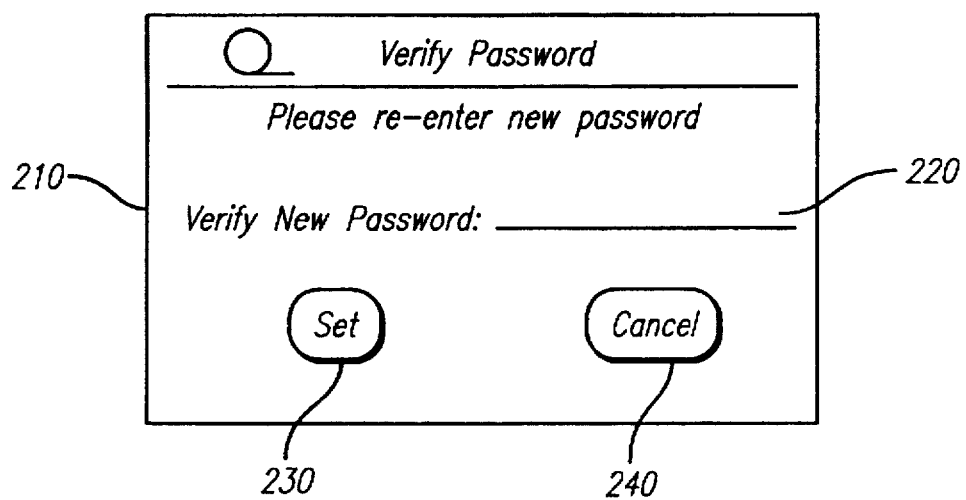
FIG. 2 is a block diagram illustrating of a password verification graphic user interface for use with an embodiment of the invention.

At step 5250, a password verification GUI window 210 is displayed. An example of such a window is shown in FIG. 2. Window 210 may include a verify new password field 220, a set button 230, and a cancel button 240. The user is directed to re-enter the proposed new password as a means of preventing mis-entry of the password. At decision block 5260, the system determines if the user has selected the cancel button. If the user has selected cancel, control proceeds to step 5270 where the password verification window 5210 is removed from the display. Control then proceeds to step 5070.

If the user has not selected cancel at decision block 5260, the system next determines if the user has indicated set at decision block 5280. If the user has not indicated set, control returns to block 5260. Once the system determines that the user has selected the set button, then at step 5290 the verified new password entered in field 220 is stored, and password verification window 5210 is removed from the display.

At decision block 5300 the new password is compared to the verified new password to see if they are identical. If they are not identical, an error message is displayed at step 5310, and the user is directed at step 5320 to re-enter the new password in field 140 in password changer window 110. Control proceeds to step 5070 to obtain this information from the user.

If the new password is identical to the verified new password, control proceeds to block 5330. At this step, the password changer spawns a remote login process with the remote computer. In a preferred embodiment of the invention, the login process is spawned by using the expect program written by Don Libes, and described in "expect: Curing Those Uncontrollable Fits of Interaction," Proceedings of the Summer 1990 USENIX Conference, Anaheim, Calif., Jun. 1990, and "Using expect to Automate System Administration Tasks," Proceedings of the Fourth USENIX LISA Large Installation Systems Administration (LISA) Conference, Colorado Springs, Colo., Oct. 17–19, 1990.

expect is an interpretative program capable of controlling interactive communications with UNIX programs. By interposing itself between the user and a UNIX process, expect can be directed to run interactive programs without user intervention. expect has several commands that are used to control the communication process. For example, the spawn command directs expect to run an interactive program or process. Additional data may be passed as arguments to the spawn command. These arguments would be passed on to the spawned process.

Another command is the expect command. One or more patterns may be passed on in the expect command. This command monitors the output from the spawned process, and watches for the pattern or patterns to appear. Once a pattern is identified in the output of the spawned process, additional arguments provide specific actions to execute. If no action is provided, the command pauses the execution of the program until the pattern appears.

Those skilled in the art are readily aware of and familiar with the command structure and operation of the expect program library. Therefore, these commands are not explained in detail. Additionally, the invention may be practiced with any program capable of initiating and controlling communications between remote processes without user intervention.

Figure 3:
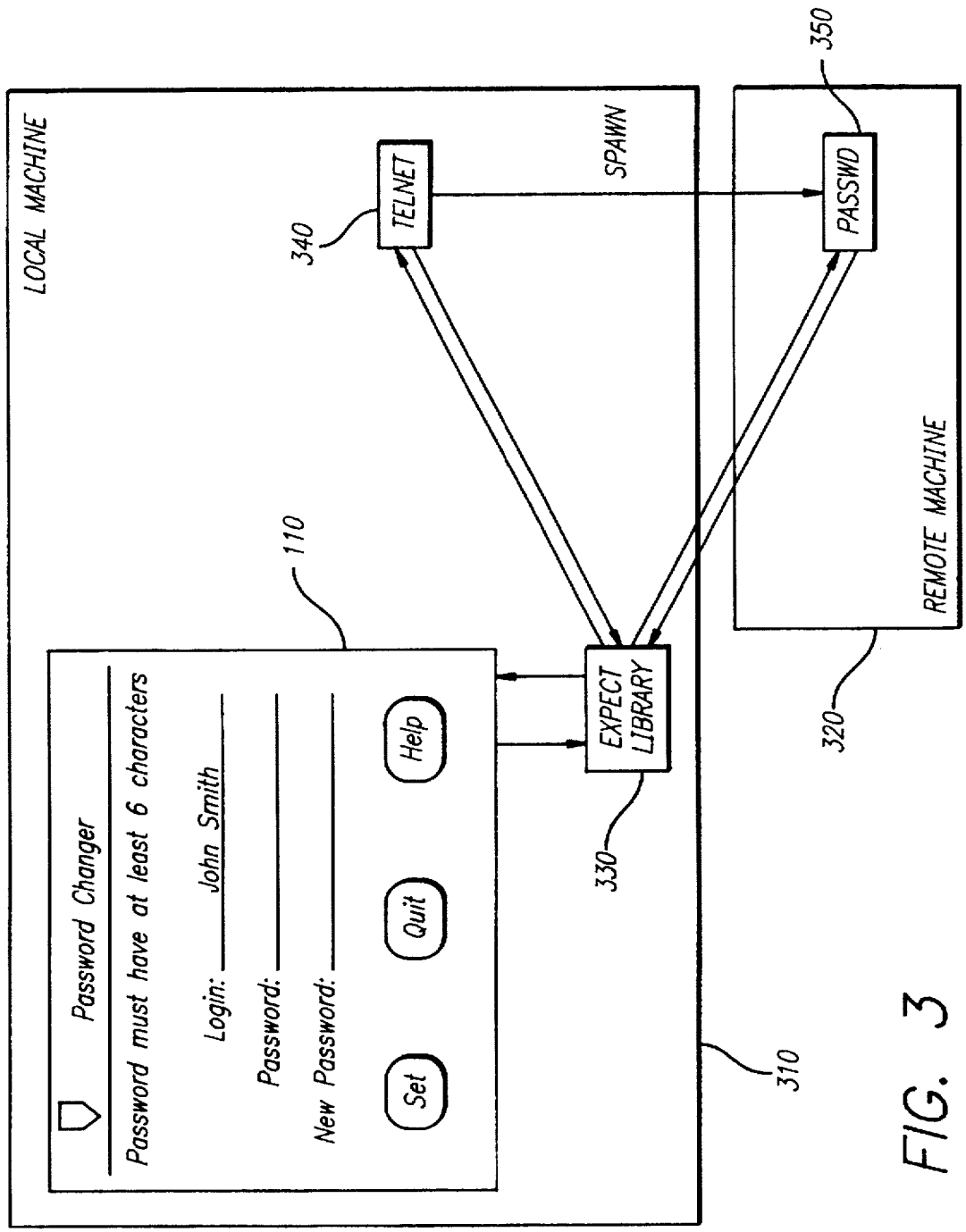
FIG. 3 is a block diagram showing the relationship between the local and remote machines in an embodiment of the invention.

Returning to the flow diagrams of FIGS. 5A through 5G, at block 5330 a login process is spawned with the remote host. This is illustrated in FIG. 3. Once the login and password information has been entered into the fields of the password changer window 110 at local machine 310, and the proposed new password has been validated (if required), expect is used to spawn a remote login process. For example, by invoking the spawn command included in expect library 330, a pseudo-tty (ptty) 340 can be created at local machine 310. Ptty 340 could be, for example, a telnet protocol for communicating with the remote machine 320. The telnet command opens up a connection with the remote computer. Once a connection is established, telnet enters an input mode where text typed from the local machine is sent to the remote machine. The operation and use of the telnet command is well known for establishing a connection with a remote host computer. Alternatively, at block 5330 a login process may be spawned using other remote communication protocols or commands, such as, for example, the UNIX rlogin command. Because these commands are well known to those skilled in the art, the details of the commands need not be explained in detail here.

Once a connection is opened between local machine 310 and remote machine 320, control proceeds to decision block 5340, where the process monitors the output from the remote machine, and waits for the appropriate login prompt. In the preferred embodiment, this is accomplished by invoking the expect command from the expect library 330. In the preferred embodiment, at block 5340 the process waits for the output of the process running at the remote machine to match with the "login:" pattern of the UNIX system. Other login patterns may be used depending upon the particular login prompt of the remote machine without deviating from the invention.

If no login prompt is found, then the system determines if the login process has "timed out" at block 5360. If the local machine has difficulty connecting to the remote machine, a login prompt may never appear, and system might otherwise become stuck waiting for the prompt. By limiting the login process to a pre-determined time period (such as 15 seconds), the process can proceed even if no connection is ever established. At block 5360, if the login process has timed out, control proceeds to step 5350 where the attempted login process is closed and the appropriate error message is sent to the user. Control then returns to block 5070 where the user may be asked if another attempt should be made to reconnect to the remote machine to change the password.

Alternatively, the system could be designed such that, when the login process has timed out, the current login process is closed and another login attempt is spawned at block 5330. Control could continue in this manner through a finite number of iterations until login is successful. If ptty 340 in FIG. 3 is unable to login to remote machine 320 after several attempts, the user could be notified of this status, and the password changer program could be terminated without changing the user's password.

If no time out is detected, control returns to block 5340 to check for the login prompt. Once a login prompt is detected, the system sends the user's login to the remote machine at block 5370. This login is identical to the login entered in field 120 in password changer window 110 in FIG. 1.

Once the user's login has been sent, the system again waits for either a time out at block 5380 or the appropriate password prompt at block 5390. At block 5380, if a time out has occurred, the login process is closed at block 5350, and an error message is sent to the user informing the user of the local machine's inability to secure a completed login at the remote machine. Alternatively, control could return to block 5330 where a new login process would be initiated at ptty 340.

If no time out is detected at block 5380, the system checks to see if the remote machine has returned a password prompt. In the preferred embodiment, this may be accomplished by invoking an expect command that waits for the appropriate string from the remote machine that would signify the password prompt. For example, the expect command can be directed to wait for an output string containing a "Password:" pattern. Depending upon the particular operating system running at the remote machine, different password prompt patterns may be used.

If no password prompt is detected in the output stream, control returns to block 5380 to determine whether the login time out threshold has been exceeded. Once a password prompt is detected at block 5390, the system sends the user's password to the remote machine at step 5400. Since the user's password has not yet been changed, the user's current password, as entered in field 130 in the password changer window 110, is sent to the remote machine.

The invention ensures security of the user's login and password because at no time is this data stored permanently in memory, such as in a file. Instead, the user's login and password are passed to the remote machine as program variables. These variables are temporarily stored in memory that is allocated at the local machine while the password changer program is executing. Once execution of the password changer program is completed, this memory is de-allocated and the user's login and password is deleted from memory. By relying upon the UNIX system password storage at the remote system, in the preferred embodiment the invention is able to provide a user-friendly interface without compromising password security.

Once the user's login and password have been sent to the remote machine, the login/password time out threshold is checked at block 5410 to see if it has been exceeded. If the time out threshold has been exceeded, the login process is closed at step 5420, and the user receives an error message concerning the status. Control proceeds to block 5070.

If the time out threshold has not been exceeded at block 5410, the system then waits to see if the remote machine has rejected the login attempt at block 5430. In the preferred embodiment, a rejected login attempt is detected by invoking an expect command and searching for the string "incorrect" in the remote machine output stream. However, other methods of detecting a rejected login attempt may be used with out departing form the scope of the invention.

If at block 5430 it is determined that the login attempt failed (because, for example, the password is incorrect), then the login process is closed and the user is notified of the login failure at step 5420. If the login attempt did not fail, then at block 5440 the output stream of the remote machine is evaluated to determine whether the remote machine is instructing the user to change his or her password. In some computer systems, the user is prompted at regular intervals to change the user's password. This is typically done to reduce or eliminate the number of old or "stale" passwords in the system.

In the preferred embodiment, at block 5440 an expect command is invoked to search for the string "Choose a new password." in the output stream of the remote machine. If this string is detected, control proceeds to block 5460. If this string is not detected, a request is sent to the host to change the user's password at block 5450. In the preferred embodiment, using expect, the UNIX (command "passwd" is sent to the host. In the preferred embodiment, this is accomplished by having ptty 340 invoke remote password process 350 at remote machine 320, as shown in FIG. 3. The passwd command is used in some UNIX systems to change or install a password associated with the user's login account name. When changing a user's password, passwd prompts for both the current and new password. The user must supply both of these passwords, and typically the new password must be entered twice to verify the change and to forestall mistakes. If the password entries do not match, the new password is rejected and passwd terminates.

If password aging has been enabled, then the system checks the user's current password to see if it has "aged" sufficiently. Password aging is the amount of time (usually a certain number of days) that must elapse before the user is allowed to choose a new password. If the old password has not sufficiently aged, the new password is rejected and passwd terminates.

Once the host system has indicated that it is time for the user to change passwords (or, alternatively, a request is sent to the host), then at block 5460 the process checks to see if the change password process has timed out. If the time out threshold has been exceeded, control passes to block 5420, the login process is terminated and an appropriate error message is displayed to the user.

If the time out threshold is not exceeded, control passes to decision block 5470, where the output stream of the remote host computer is monitored to see if the remote machine is prompting for entry of the user's old (or current) password. An expect command is used in the preferred embodiment to determine the presence of such a prompt. For example, an expect command may be used to search for the phrase, "Old password:" in the output stream. If this pattern is not located, then control returns to block 5460 to see if the process has timed out.

If the old password prompt is detected, then the current password is sent to the remote computer at block 5480. The user's current password, as entered in field 130 in the password changer window 110, may be sent to the remote machine using the send command from the expect library, or by any other method generally known in the art.

Once the user's current password is sent, then at block 5490 the output stream of the remote machine is monitored to determine if the remote machine considers the current password valid. To determine if the remote machine considers the current password invalid, an expect command may be used to watch for the appropriate word or phrase indicative of password failure, such as, for example, the word, "Sorry." If it is determined that the current password is invalid, control passes to block 5420, the login process is closed, and an error message is sent to the user.

At decision block 5500, the system determines whether the remote machine has indicated a prompt for the proposed new password. An expect command may be used to determine if the new password prompt is present in the output stream. For example, an expect command may be used to search for the pattern "New password:" in the output stream. If the host machine is not prompting for entry of the new password, control remains at block 5500. After the new password prompt is recognized in the output stream, the user's new password, as entered in field 140 in the password changer window 100, is sent to the remote machine at block 5510.

The remote machine may then perform validation checks on the proposed new password. An embodiment of the invention may also perform similar validation checks on the user's proposed new password so that validation errors in the new password may be anticipated and corrected before a remote communication is established with the remote machine. If designed with the remote machine's validation scheme in mind, this "local" validation should ensure that the user's proposed new password also passes the remote machine's validation process. Alternatively, an embodiment of the invention can be practiced without performing local validation, or without performing any password validation at all.

In the typical UNIX operating system, new passwords are checked to determine if they are too long or too short (blocks 5520 and 5540), have at least two alphabetic characters and at least one numeric or special character (block 5550), and/or and differ from the old password by at least three characters (block 5560). An expect command may be used to monitor the output stream of the remote machine to locate the appropriate string indicating failure of any of these validation checks. For example, the expect command could be invoked to search for the patterns, "Password is too short," "Password is too long," "at least two alphabetic," or "Passwords must differ by at least 3." If any of these patterns are located, control passes to block 5530 where the login process is terminated and the user is notified of the error.

The output stream is also monitored to determine if the new password meets all of the validation requirements of the remote machine. If the new password is acceptable, the remote machine will ask the user to re-enter the new password to verify its spelling. Thus, at block 5570 the output stream of the remote machine is searched for an indication that the remote machine is requesting verification. For example, an expect command may be invoked to search for the pattern, "new password:" in the output stream. If the invention does not locate a verification prompt, control returns to block 5520 to see if any other validation related prompt has been sent by the remote machine.

If the output stream contains a verification request, control passes to block 5580 and the new password is resent to the remote machine. The process then checks to see if the remote machine has indicated acceptance of the new password at block 5590. This is typically indicated in UNIX by returning the command prompt, to the display. If no command prompt is located in the output stream after verification of the new password, then control proceeds to block 5600 where the login process is closed and the user is notified that the user's password was not changed. If the host indicates that the password change is successful at block 5590, the login process is terminated at block 5610. Termination of the login process may be accomplished, for example, by sending an "exit" command to the remote machine using the expect library commands.

Once the login process is terminated, the user is notified that the password change was successful at block 5620. At block 5630, the change password GUI window 110 is closed. The password changing process is then successfully terminated at step 5640.

Thus, a method and apparatus has been described in conjunction with one or more specific embodiments. The invention is defined by the claims and their full scope of equivalents.

I claim:

1. A method implemented by a computer for updating a password, said method comprising the steps of:
   prompting a user to enter user information at a local machine, said user information comprising user identification information, old password information, and new password information;
   receiving said user information;
   after receiving said user information, spawning a communication process at said local machine, said communication process:
      establishing communication with a remote machine via a communications network coupled to said local machine;
      transmitting a first portion of said user information comprising said user identification information to said remote machine via said communications network;
      awaiting receipt of first responsive information from said remote machine via said communications network;
      transmitting a second portion of said user information comprising said old password information to said remote machine via said communications network only upon receipt of said first responsive information;
      awaiting receipt of second responsive information from said remote machine via said communications network;
      transmitting a third portion of said user information comprising said new password information to said remote machine via said communications network only upon receipt of said second responsive information;
      awaiting receipt of third responsive information from said remote machine via said communications network.

2. The method of claim 1 wherein said prompting said user to enter user information comprises displaying a graphic interface for receiving said user information.

3. The method of claim 2 wherein said new password information is validated, according to a first set of validation criteria, at said local machine before said spawning of said communication process.

4. The method of claim 3 wherein said new password information is stored at said local machine after validation.

5. The method of claim 3 wherein said new password information is stored in a temporary memory area at said local machine after validation.

6. The method of claim 5 wherein said temporary memory area is de-allocated at said local machine upon receipt of said third responsive information.

7. The method of claim 2 wherein said user identification information and old password information are transmitted from said local machine to said remote machine using at least one of a first set of commands.

8. The method of claim 7, wherein said first responsive information comprises an indication that said local machine is successfully connected to a user's account at said remote machine.

9. The method of claim 8 wherein said receiving of said first responsive information is accomplished using an expect command.

10. The method of claim 8 wherein said communication process transmits a request to update said password after receipt of said first responsive information.

11. The method of claim 10 wherein said third responsive information comprises an indication that said password was either successfully or unsuccessfully updated.

12. The method of claim 10 wherein said transmitting of said request to update said user's password is accomplished using a password command.

13. The method of claim 2 wherein said graphic interface includes fields for entering said user identification information, old password information and new password information.

14. An article of manufacture comprising:
   a computer usable medium having computer readable program code embodied therein for updating a password, said computer readable program code comprising:
      computer readable program code configured to cause said local computer to prompt a user to enter user information at said local machine, said user information comprising user identification information, old password information, and new password information;
   computer readable program code configured to cause said local computer to receive said user information;
   computer readable program code configured to cause said local computer, after receiving said user information, to spawn a communication process at said local machine, said communication process:
      establishing communication with a remote machine over a communications network coupled to said local machine;
      transmitting a first portion of said user information comprising said user identification information to said remote machine via said communications network;
      awaiting receipt of first responsive information from said remote machine via said communications network;
      transmitting a second portion of said user information comprising said old password information to said remote machine via said communications network only upon receipt of said first responsive information;
      awaiting receipt of second responsive information from said remote machine via said communications network;
      transmitting a third portion of said user information comprising said new password information to said remote machine via said communications network only upon receipt of said second responsive information;
      awaiting receipt of third responsive information from said remote machine via said communications network.

15. The article of manufacture of claim 14 wherein said computer readable program code for prompting said user to enter user information comprises computer readable program code to cause said local computer to display a graphic interface for receiving said user information.

16. The article of manufacture of claim 15 comprising computer readable program code configured to cause said local machine to validate said new password information, according to a first set of validation criteria, at said local machine before said communication is spawned.

17. The article of manufacture of claim 16 comprising computer readable program code configured to cause said local machine to store said new password information in a temporary memory area at said local machine after validation.

18. The article of manufacture of claim 17 comprising computer readable program code configured to cause said local machine to de-allocate said temporary memory area upon receipt of said third responsive information.

19. The article of manufacture of claim 15 comprising computer readable program code configured to cause said local machine to accomplish transmission of said user identification information and old password information over a network using at least one of a first set of commands.

20. The article of manufacture of claim 19 said first responsive information comprises an indication that said local machine is successfully connected to a user's account.

21. The article of manufacture of claim 20 comprising computer readable program code configured to cause said local machine to transmit a request to update said password after receipt of said first responsive information.

22. The article of manufacture of claim 21 wherein said third responsive information comprises an indication that said password was either successfully or unsuccessfully updated.

23. An apparatus for updating a password, comprising:

a local machine, said local machine spawning a communication process at said local machine after entry of user information comprising user identification information, old password information, and new password information at said local machine, said communication process:

establishing communication with a remote machine over a communications network coupled to said local machine;

transmitting a first portion of said user information comprising said user identification information to said remote machine via said communications network;

awaiting receipt of first responsive information from said remote machine via said communications network;

transmitting a second portion of said user information comprising said old password information to said remote machine via said communications network only upon receipt of said first responsive information;

awaiting receipt of second responsive information from said remote machine via said communications network;

transmitting a third portion of said user information comprising said new password information to said remote machine via said communications network only upon receipt of said second responsive information;

awaiting receipt of third responsive information from said remote machine via said communications network.

24. The apparatus of claim 23 wherein said user information is entered in a graphic interface.

25. The apparatus of claim 24 wherein said graphic interface comprises fields for entering said user identification information, old password information and new password information.

26. The apparatus of claim 24 wherein said new password information is validated, according to a first set of validation criteria, at said local machine before said spawning.

27. The apparatus of claim 26 wherein said new password information is stored in a temporary memory area at said local machine after validation.

28. The apparatus of claim 27 wherein said temporary memory area is de-allocated at said local machine upon receipt of said third responsive information.

29. The apparatus of claim 27 wherein said user identification information and old password information are transmitted using at least one of a first set of commands.

30. The apparatus of claim 29 wherein said first responsive information comprises an indication that said local machine is successfully connected to a user's account.

31. The apparatus of claim 30 wherein said communication process transmits a request to update said password after receipt of said first responsive information.

32. The apparatus of claim 31 wherein said third responsive information comprises an indication that said password was either successfully or unsuccessfully updated.

* * * * *